(12) United States Patent
Singh et al.

(10) Patent No.: US 9,860,150 B2
(45) Date of Patent: Jan. 2, 2018

(54) FAST CONVERGENCE OF EVPN NETWORKS FOR MULTI HOMING TOPOLOGIES

(71) Applicant: Juniper Networks, Inc., Sunnyvale, CA (US)

(72) Inventors: Nitin Singh, Fremont, CA (US); Kapil Arora, Bangalore (IN); Ramesh Kandula, Bangalore (IN); Santosh Pallagatti Kotrabasappa, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 50 days.

(21) Appl. No.: 14/921,965

(22) Filed: Oct. 23, 2015

(65) Prior Publication Data

US 2017/0099180 A1 Apr. 6, 2017

(30) Foreign Application Priority Data

Oct. 1, 2015 (IN) ............................ 5257/CHE/2015

(51) Int. Cl.
*H04L 12/24* (2006.01)
*H04L 12/26* (2006.01)
(Continued)

(52) U.S. Cl.
CPC ............ *H04L 43/10* (2013.01); *H04L 12/413* (2013.01); *H04L 12/46* (2013.01);
(Continued)

(58) Field of Classification Search
CPC ..... H04L 41/0668; H04L 43/10; H04L 45/02; H04L 45/66; H04L 45/72
See application file for complete search history.

(56) References Cited

U.S. PATENT DOCUMENTS

| 7,746,796 B2* | 6/2010 | Swallow | ................. | H04L 43/50 370/249 |
| 7,765,306 B2* | 7/2010 | Filsfils | .................... | H04L 45/02 709/207 |

(Continued)

FOREIGN PATENT DOCUMENTS

EP 1863225 A1 12/2007

OTHER PUBLICATIONS

Kompella et al., "Detecting Multi-Protocol Label Switched (MPLS) Data Plane Failures," RFC 4379, Network Working Group, Feb. 2006, 50 pp.

(Continued)

*Primary Examiner* — Alpus H Hsu
(74) *Attorney, Agent, or Firm* — Shumaker & Sieffert, P.A.

(57) ABSTRACT

In general, techniques of this disclosure may enable a remote provider edge (PE) router to improve convergence time in response to a link failure in an Ethernet Virtual Private Network (EVPN) by establishing per-Ethernet Segment Identifier (ESI) Bidirectional Forwarding Detection (BFD) sessions with other PE routers that are coupled to the PE router in an EVPN. The remote PE may determine that at least two PE routers with the remote PE are locally connected to a multi-homed customer network by a particular Ethernet Segment. The remote PE may send, based on determining that the at least two PE routers are connected to the multi-homed customer network by the particular Ethernet Segment, an ESI Ping request packet through the intermediate network to one of the at least two PE routers, wherein the ESI Ping request packet includes at least a BFD discriminator and an ESI for the particular Ethernet Segment.

20 Claims, 5 Drawing Sheets

(51) Int. Cl.
  *H04L 12/721* (2013.01)
  *H04L 12/751* (2013.01)
  *H04L 12/46* (2006.01)
  *H04L 12/707* (2013.01)
  *H04L 12/413* (2006.01)

(52) U.S. Cl.
  CPC .......... *H04L 43/0817* (2013.01); *H04L 45/02* (2013.01); *H04L 45/24* (2013.01); *H04L 45/66* (2013.01); *H04L 45/72* (2013.01)

(56) References Cited

U.S. PATENT DOCUMENTS

| | | | | |
|---|---|---|---|---|
| 7,782,847 B2* | 8/2010 | Hua | H04L 43/0811 | 370/389 |
| 7,787,478 B2* | 8/2010 | Khouderchah | H04L 12/4641 | 370/352 |
| 7,808,919 B2* | 10/2010 | Nadeau | H04L 43/026 | 370/248 |
| 7,839,796 B2* | 11/2010 | Venkateswaran | H04L 12/2697 | 370/252 |
| 7,852,778 B1 | 12/2010 | Kompella | | |
| 7,948,900 B2* | 5/2011 | Hart | H04L 12/2697 | 370/238 |
| 7,966,420 B2* | 6/2011 | Mehta | H04L 12/2697 | 709/238 |
| 8,082,340 B2* | 12/2011 | Filsfils | H04L 12/2602 | 709/206 |
| 8,179,900 B2* | 5/2012 | Kitada | H04L 45/00 | 370/217 |
| 8,339,973 B1* | 12/2012 | Pichumani | H04L 43/10 | 370/248 |
| 8,374,164 B2* | 2/2013 | Nadeau | H04L 41/12 | 370/225 |
| 8,543,728 B2* | 9/2013 | Pan | H04L 45/22 | 370/221 |
| 8,761,048 B2* | 6/2014 | Sajassi | H04L 41/12 | 370/254 |
| 8,767,731 B2* | 7/2014 | Balus | H04L 12/4641 | 370/229 |
| 8,842,577 B2* | 9/2014 | Sajassi | H04L 45/66 | 370/255 |
| 8,885,484 B2* | 11/2014 | Birajdar | H04L 12/4641 | 370/242 |
| 8,902,780 B1* | 12/2014 | Hegde | H04L 45/70 | 370/252 |
| 8,948,055 B2* | 2/2015 | Bragg | H04L 12/462 | 370/255 |
| 8,953,590 B1 | 2/2015 | Aggarwal et al. | | |
| 9,001,644 B2* | 4/2015 | Salam | H04L 41/0677 | 370/222 |
| 9,049,133 B2* | 6/2015 | Boutros | H04L 45/14 | |
| 9,094,344 B2* | 7/2015 | Boutros | H04L 49/351 | |
| 9,210,089 B2* | 12/2015 | Akiya | H04L 47/125 | |
| 9,344,325 B2* | 5/2016 | Jain | H04L 41/0668 | |
| 9,497,107 B1* | 11/2016 | Akiya | H04L 45/22 | |
| 2015/0006757 A1 | 1/2015 | Boutros et al. | | |

OTHER PUBLICATIONS

Katz et al., "Bidirectional Forwarding Detection (BFD)," RFC 5880, Internet Engineering Task Force (IETF), Jun. 2010, 49 pp.

Aggarwal et al., "Bidirectional Forwarding Detection (BFD) for MPLS Label Switched Paths (LSPs)," RFC 5884, Internet Engineering Task Force (IETF), Jun. 2010, 12 pp.

Sajassi, et al., "BGP MPLS-Based Ethernet VPN," RFC 7432, Internet Engineering Task Force (IETF), Feb. 2015, 56 pp.

Extended Search Report from counterpart European Application No. 16191893.3, dated Mar. 6, 2017, 9 pp.

Response filed Oct. 2, 2017 to the Extended Search Report dated Mar. 6, 2017, from counterpart European Application No. 16191893.3, 17 pp.

* cited by examiner

FAST CONVERGENCE OF EVPN NETWORKS FOR MULTI HOMING TOPOLOGIES

This application claims priority to India Patent Application No. 5257/CHE/2015, filed Oct. 1, 2015, the entire content of which is incorporated herein by reference

TECHNICAL FIELD

The invention relates to computer networks and, more specifically, to forwarding network traffic within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

In an EVPN, MAC learning between PE network devices occurs in the control plane rather than in the data plane (as happens with traditional bridging) using a routing protocol. For example, in EVPNs, a PE network device typically uses the Border Gateway Protocol (BGP) (i.e., an L3 routing protocol) to advertise to other provider edge network devices the MAC addresses learned from the local consumer edge network devices to which the PE network device is connected. A PE device may use BGP route advertisement message to announce reachability information for the EVPN, where the BGP route advertisement specifies one or more MAC addresses learned by the PE network device instead of L3 routing information.

In an EVPN configuration referred to as all-active mode, an Ethernet segment includes multiple PE network devices that provide multi-homed connectivity for one or more local customer network devices. Moreover, the multiple PE network device provide transport services through the intermediate network to a remote PE network device, and each of the multiple PE network devices in the Ethernet segment operates forwards Ethernet frames in the segment for the customer network device. When a network failure occurs at one of the multiple PE network devices that provide multi-homed connectivity, an upstream PE network device in the EVPN may detect the failure via BGP and withdraw the failed network PE device. However, the withdrawal period may take multiple seconds, during which network traffic is still forwarded to the failed network PE device and dropped.

SUMMARY

The techniques described herein enable a remote PE router to improve convergence time in response to a link failure in an EVPN by establishing per-Ethernet Segment Identifier (ESI) Bidirectional Forwarding Detection (BFD) sessions with other PE routers that are coupled to the PE router in EVPN active-active mode. For instance, in response to receiving Ethernet Auto-Discovery routes from the other PE routers, the remote PE router may determine that each of the other PE routers are included in the same Ethernet Segment. The remote PE router may send ESI Ping request packets, which include the ESI for the Ethernet Segment and respective BFD discriminators generated by the remote PE router, to each of the other PE routers. In response to receiving ESI Ping reply packets from the other PE routers, the remote PE router may execute per-ESI BFD sessions with each of the other PE routers. Using EVPN label stacks, BFD packets for the per-ESI BFD sessions are tunneled through the EVPN between the remote PE router and the respective other PE routers.

If a communication link in the Ethernet Segment fails between a customer edge router and a particular PE router that is executing a per-ESI BFD session, the particular PE router terminates or otherwise interrupts the per-ESI BFD session with the remote PE router for the Ethernet Segment. In response to determining that the per-ESI BFD session has been interrupted or terminated, the remote PE router may update its forwarding information to re-direct network traffic to other PE routers in the Ethernet segment. In this way, the remote PE router can bypass the particular PE router that initially terminated the per-ESI BFD session because traffic can longer flow in the Ethernet Segment from the particular PE router to the customer edge router. By immediately re-directing traffic network upon failure of the per-ESI BFD session, techniques of the disclosure may prevent fewer dropped packets than waiting for a control plane message to withdraw the particular PE router from the Ethernet Segment.

In some examples, a method includes determining, by a remote provider edge (PE) router coupled by an intermediate network to at least two PE routers operating in an Ethernet Virtual Private Network (EVPN) with the remote PE router, that the at least two PE routers are locally connected to a multi-homed customer network by a particular Ethernet Segment; and sending, by the remote PE router and based on determining that the at least two PE routers operating in the EVPN are connected to the multi-homed customer network by the particular Ethernet Segment, an Ethernet Segment Identifier (ESI) Ping request packet through the intermediate network to one of the at least two PE routers, wherein the ESI Ping request packet includes at least a Bidirectional Forwarding Detection (BFD) discriminator and an ESI for the particular Ethernet Segment that locally connects the at least two PE routers to the multi-homed customer network.

In some examples, a remote PE router is coupled by an intermediate network to at least two PE routers operating in an Ethernet Virtual Private Network (EVPN) with the remote PE router, wherein the remote PE router includes: a routing engine that determines that the at least two PE routers are locally connected to a multi-homed customer network by a particular Ethernet Segment; and a forwarding unit that sends, based on the routing engine determining that the at least two PE routers operating in the EVPN are connected to the multi-homed customer network by the particular Ethernet Segment, an Ethernet Segment Identifier (ESI) Ping request packet through the intermediate network to one of the at least two PE routers, wherein the ESI Ping request packet includes at least a Bidirectional Forwarding Detection (BFD) discriminator and an ESI for the particular Ethernet Segment that locally connects the at least two PE routers to the multi-homed customer network.

In some examples, a computer-readable medium includes instructions for causing at least one programmable processor of a remote provider edge (PE) router, to: determine, by the remote provider edge (PE) router coupled by an intermediate network to at least two PE routers operating in an Ethernet Virtual Private Network (EVPN) with the remote PE router, that the at least two PE routers are locally connected to a multi-homed customer network by a particular Ethernet Segment; and send, based on determining that the at least two PE routers operating in the EVPN are connected to the multi-homed customer network by the particular Ethernet Segment, an Ethernet Segment Identifier (ESI) Ping request packet through the intermediate network to one of the at least two PE routers, wherein the ESI Ping request packet includes at least a Bidirectional Forwarding Detection (BFD) discriminator and an ESI for the particular Ethernet Segment that locally connects the at least two PE routers to the multi-homed customer network.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
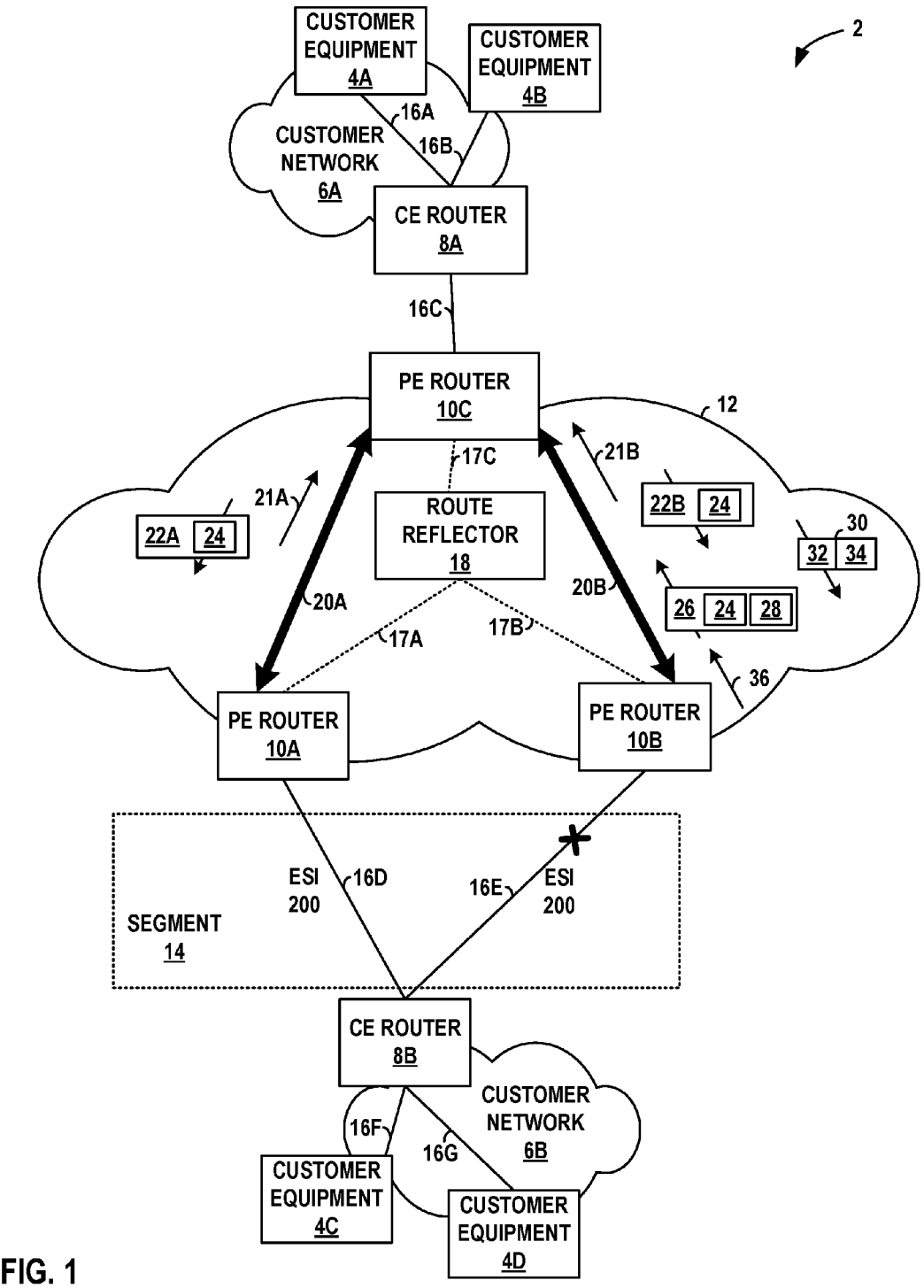
FIG. 1 is a block diagram illustrating an example system, in accordance with techniques of the disclosure.

FIG. 1 is a block diagram illustrating an example system, in accordance with techniques of the disclosure. In the example of FIG. 1, PE routers 10A-10C ("PE routers 10") provide customer devices 4A-4D ("customer devices 4") associated with customer networks 6A-6B ("customer networks 6") with access to service provider network 12 via CE routers 8A-8B ("CE routers 8"). Communication links 16A-16G may be Ethernet, ATM or any other suitable network connections.

PE routers 10 and CE routers 8 are illustrated as routers in the example of FIG. 1. However, techniques of the disclosure may be implemented using switches or other suitable network devices that participate in a layer two (L2) virtual private network service, such as an Ethernet Virtual Private Network (EVPN). Customer networks 6 may be networks for geographically separated sites of an enterprise. Each of customer networks 6 may include additional customer equipment 4A-4D ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other.

Service provider network 12 may include a variety of network devices other than PE routers 10. For instance, service provider network 12 may include a route reflector 18. In some examples, route reflector 18 may reside within service provider network 12 and along a path in service provider network 12 between two or more PE routers. Because of an internal BGP (IBGP) full-mesh requirement, some networks may use route reflectors to simplify configuration. Using a route reflector, routers are grouped into clusters, which are identified by numeric identifiers unique to an autonomous system (AS). Within the cluster, a BGP session is configured from a single router (the route reflector) to each internal peer. With this configuration, the IBGP full-mesh requirement may be met by route reflector 18. To use route reflection in an AS, one or more routers are designated as a route reflector—typically, one per point of presence (POP). Route reflectors have the BGP ability to re-advertise routes learned from an internal peer to other internal peers. Rather than requiring all internal peers to be fully meshed with each other, route reflection may have only the route reflector be fully meshed with all internal peers.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes L2 EVPN service. For example, an EVPN is a service that provides a form of L2 connectivity across an intermediate L3 network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router, such as PE routers 10A-10C. Consequently, multiple EVIs may be configured on PE routers 10 for Ethernet segment 14, as further described herein, each providing a separate, logical layer two (L2) forwarding domain. In this way, multiple EVIs may be configured that each includes one or more of PE routers 10A-10C of Ethernet segment 14. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In the example of FIG. 1, for use in transporting communications associated with one or more EVIs, the network operator configures PE routers 10 to provision pseudowires 17A-17C for transporting L2 communications. Pseudowires are logical network connections formed from two unidirectional label switched paths (LSPs) that emulate a connection not natively offered by service provider network 12 for consumption outside the boundaries of that service provider network 12. Pseudowires may emulate a L2 connection within service provider network 12 enabling service provider network 12 to offer emulated L2 connectivity externally for consumption by L2 customer networks 6. As such, each EVPN instance may operate over pseudowires 17 to enable a logical form of L2 connectivity between customer networks 6.

To configure an EVI, pseudowires 17 may be configured such that each of PE routers 10 that provide a given EVI is interconnected by way of pseudowires to every other one of the PE devices participating in the EVI. In the example of FIG. 1, each of PE routers 10 provides access to the EVPN for carrying traffic associated with customer networks 6 and, therefore, each of PE devices 10 within the same Ethernet segment may be connected to every other PE device 10 via pseudowires 17. Once pseudowires are configured in this manner, EVPN may be enabled within PE devices 10 to operate over the pseudowires, which may in this context operate as logical dedicated links through service provider network 12. In operation, EVPN generally involves prepending or otherwise inserting a tag and a pseudowire label onto incoming L2 packets, which may also be referred to as L2 frames (particularly in the context of Ethernet), and transmitting the tagged packets through a corresponding one of the configured pseudowires. Once EVPN is configured within service provider network 12, customer devices 4 within customer networks 6 may communicate with one another via EVPN as if they were directly connected L2 networks.

In order to establish the EVPN, an EVPN protocol executing on PE routers 10A-10C triggers EVPN designated forwarder (DF) election for Ethernet segment 14. This may be accomplished, for example, by EVPN protocol executing on each of PE routers 10A-10C that participates in the Ethernet segment directing the router to output a routing protocol message advertising an Ethernet Segment Identifier (ESI), which is typically unique across all EVPN instances (EVIs). In addition, for each EVI, the EVPN protocol directs the router to output a routing protocol message advertising an Ethernet Auto-Discovery (AD) route specifying the relevant ESI for the Ethernet segment coupled to the EVPN instance. Once the EVPN is operational for the {EVI, ESI} pair, PE routers 10A-10C output routing protocol messages to remote PE router 10D to announce media access control (MAC) addresses associated with customer equipment in customer network 6B.

For example, in typical operation, PE routers 10A-10C communicate using the Border Gateway Protocol (BGP) and the EVPN protocol specifies BGP Network Layer Reachability Information (NLRI) for the EVPN and may define different route types for conveying EVPN information via the BGP routing protocol. The EVPN NLRI is typically carried in BGP using BGP Multiprotocol Extensions. An Ethernet Segment route advertised by each PE router 10A-10C using BGP includes a Route Distinguisher and Ethernet Segment Identifier. An Ethernet AD route advertised by each PE router 10A-10C for each EVI, specifies a Route Distinguisher (RD) (e.g., an IP address of an MPLS Edge Switch (MES)), ESI, Ethernet Tag Identifier, and MPLS label. Subsequent BGP media access control (MAC) routes output by PE router 10A-10C announce MAC addresses of customer equipment 4 for the EVPN include a RD, ESI, Ethernet Tag Identifier, MAC address and MAC address length, IP address and IP address length, and MPLS label.

In active-standby mode in which one of PE router 10A or 10B forwards network traffic from PE router 10C to CE router 8B, the EVPN protocol executing on each PE router 10A-10C initiates EVPN DF election for the Ethernet segment on a per-EVPN instance basis, and participates within that election for each EVPN instance. That is, DF election may be at the granularity of each ESI, EVI combination. If elected DF, one of PE routers 10A-10C elected as DF forwards traffic from the EVPN to local CE router 8B. Additional example information with respect to the EVPN protocol is described in "BGP MPLS Based Ethernet VPN," draft-ietf-l2vpn-evpn-11, Internet Engineering Task Force (IETF), Jul. 2, 2014, the entire contents of which are incorporated herein by reference.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including MAC addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize MAC address route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN. Accordingly, PE routers 10 may perform both local learning and remote learning of MAC addresses.

Each of PE routers 10 (e.g., PE router 10D) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8B is coupled to PE routers 10A and 10B via links 16D and 16E, respectively, where PE routers 10A and 10B are capable of providing access to EVPN for L2 customer network 6B via CE router 8B. In instances where a given customer network (such as customer network 6B) may couple to service provider network 12 via two different and, to a certain extent, redundant links, the customer network may be referred to as being "multi-homed." In this example, CE router 8B may be multi-homed to PE routers 10A and 10B because CE router 8B is coupled to two different PE routers 10A and 10B via separate and, to a certain extent, redundant links 16D and 16E where both of PE routers 10A and 10B are capable of providing access to EVPN for L2 customer network 6B. Multi-homed networks are often employed by network operators so as to improve access to EVPN provided by service provider network 12 should a failure in one of links 16D, 16E, and 16F occur. In a typical EVPN configuration, only the multi-homing PEs 10A-10B participate in DF election for each ESI. PE 10C not connected to the ESI has no direct knowledge of the DF election result for a give ESI.

In active-active mode configurations, remote PE 10C is typically configured to install the MAC routes for the ESI, such that traffic downstream traffic to customer network 6B is balanced between PE routers 10A and 10B, which are each included in the ESI. In the example of FIG. 1, PE routers 10A and 10B may be configured in EVPN active-active mode, such that PE router 10C load-balances downstream network traffic to customer network 6B between PE routers 10A and 10B. In active-active mode, each of PE routers 10A and 10B may be configured as part of the same Ethernet Segment and therefore have the same Ethernet Segment Identifier. PE routers 10A and 10B may each advertise Ethernet AD routes to PE router 10C that specify respective IP addresses and ESIs for each of PE routers 10A and 10B. In this way, PE router 10C may configure one or more of its forwarding units (or "forwarding engines") to load balance network traffic destined for customer network 6B between PE routers 10A and 10B.

An EVPN, such as illustrated in FIG. 1, may operate over an Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, PE routers 10A-10C may provide an MPLS core for sending network packets from customer network 6A to and from customer network 6B. Each of PE routers 10A-10C implement the MPLS protocol and apply one or more MPLS labels, i.e., a label stack, to network packets in accordance with routing and forwarding information configured at each respective PE router. In an EVPN, a label stack applied to a network packet may include multiple labels. For instance, a label stack may include an outer label and an inner label.

The outer label serves as a "transport label" that uniquely identifies a PE router in an MPLS core. That is, each of PE routers 10A-10C may exchange control plane messages at configuration and startup that specify an outer label that uniquely identifies each respective PE router. For instance, PE router 10A may send control plane messages that specify an outer label that identifies PE router 10A to PE routers 10B-10C. PE routers 10B-10C may configure their respective forwarding units such that network packets that include the outer label corresponding to PE router 10A are forwarded to PE router 10A.

The inner label, or "service label," of the MPLS label stack provides EVPN-specific configuration information. As described above, EVPN defines Ethernet AD routes, MAC advertisement routes, and Ethernet Segment routes. An Ethernet AD route, for example, may be structured according to the following format of Table 1:

TABLE 1

AD route advertisement

Route Descriptor (8 octets)
Ethernet Segment Identifier (10 octets)
Ethernet Tag ID (4 octets)
MPLS Alias Label (3 octets)

In one example, PE router 10A may send an Ethernet AD route to PE router 10C initially at startup and configuration that includes an MPLS label as shown above. PE router 10C may configure one or more of its forwarding units to apply the MPLS label of the Ethernet AD route from PE router 10A as the inner label in a label stack applied to network packets that are destined to PE router 10A. PE router 10C would then apply the transport label identifying PE router 10A as the outer label in the label stack. In this way, the inner label provides EVPN-specification configuration information about the Ethernet AD route that PE router 10C uses to forward network packets through the EVPN.

In EVPN architectures, such as FIG. 1, a link may fail, such as 16E between PE router 10B and CE router 8B. In such examples, PE router 10C may determine that link 17B has failed upon PE router 10B notifying PE router 10C via BGP that network traffic cannot reach CE router 8B from PE router 10B. Once PE router 10C has determined that PE router 10B is no longer available to forward network traffic to customer network 6B, PE router 10C may take corrective action by removing PE router 10B from an adjacency list that includes the members of the Ethernet Segment that previously included PE routers 10A and 10B. PE router 10C, upon updating the adjacency list, may then start sending traffic only to PE router 10A and stop load balancing network traffic between PE routers 10A and 10B.

Because BGP is a control-plane messaging protocol, PE router 10C may not determine for a number of seconds that link 16E has failed or that network traffic is no longer flowing from PE router 10C to CE router 8B via PE router 10B. Until PE router 10A has taken the corrective action to remove PE router 10B from the adjacency list and start sending traffic only to PE router 10A, PE router 10C may continue sending traffic for, potentially a number seconds, to PE router 10B although the traffic will be dropped at PE router 18B because communication link 16B has failed.

Techniques of this disclosure may reduce the amount of time that network traffic is dropped at PE router 18B in the event that network traffic cannot reach CE router 8B from PE router 10C via PE router 10B. By re-directing network traffic away from PE router 10B in the event of a failure of link 16E or at a network device on a path between route reflector 18 and PE router 10B (e.g., a network device that forms part of pseudowire 17B), the amount of time that network traffic is dropped may be reduced from seconds to an order of milliseconds, such as less than 100 or 50 milliseconds. Techniques of the disclosure may configure PE router 10C to run Bidirectional Forwarding Detection (BFD) over EVPN on a per-ESI basis. That is, PE router 10C may run BFD sessions on a per-ESI basis with each PE router operating in active-active mode in the same Ethernet Segment (e.g., having the same ESI). In this way, if PE router 10C determines for example, via a per-ESI BFD session with PE router 10B, that network traffic cannot reach CE router 8B from via PE router 10B, then PE router 10C may immediately re-direct network traffic for the Ethernet Segment away from PE router 10B and to other PE routers that are coupled to PE router 10C in active-active mode in the same Ethernet Segment, such as PE router 10A.

In the example of FIG. 1, each of PE routers 10A-10C runs EVPN and BFD protocols. At initial configuration and startup, each of PE routers 10A and 10B may advertise Ethernet AD routes 21A, 21B, as described above. PE router 10C may inspect the contents of each Ethernet AD route and determine that an ESI for an Ethernet AD route 21B advertised by PE router 10B matches an ESI for an Ethernet AD route 21A advertised by PE router 10A. PE router 10C may also determine that PE router 10C is coupled to each of PE routers 10A and 10B, which are configured in EVPN active-active mode for Ethernet Segment 14 having an ESI 200. Based on determining that PE router 10C is coupled to each of PE routers 10A and 10B operating in active-active mode for Ethernet Segment 14, PE router 10C may send Ethernet Segment Identifier Ping ("ESI Ping") request packets 22A, 22B to each of PE routers 10A and 10B, respectively. More generally, PE router 10C may send ESI Ping request packets to exercise all paths of an ESI.

As further described in this disclosure, an ESI Ping request packet may be used to initiate and establish a BFD session on a per-ESI basis between two PE routers in an EVPN. In some examples, an ESI Ping request packet may be a Label-Switch Path Ping ("LSP Ping") exploration message that further includes a label stack for routing the packet within an EVPN. Additional example information with respect to an LSP Ping message is described in U.S. Pat. No. 7,852,778 "Verification of Network Paths Using Two or More Connectivity Protocols," which issued on Dec. 14, 2010, the entire contents of which are incorporated herein by reference. Additional example information with respect to an LSP Ping message is also described in RFC 5884 "Bidirectional Forwarding Detection (BFD) for MPLS Label Switched Paths (LSPs)," June 2010, the entire contents of which are incorporated herein by reference. The label stack for routing the ESI Ping request packet within an EVPN may include an outer transport label and an inner service label as described above.

As an example, upon determining that PE router 10C is coupled to each of PE routers 10A and 10B operating in active-active mode for Ethernet Segment 14, PE router 10C may generate ESI Ping requests that PE router 10C sends to PE routers 10A and 10B. For instance, PE router 10C may generate the ESI Ping request packet as an LSP ping exploration packet for PE router 10B with an attached EVPN label stack that includes an outer transport label for a next hop on a path to PE router 10B and inner service label that represents the MPLS Alias Label, which PE router 10B previously advertised to PE router 10C in an Ethernet AD route. Additional example information with respect to an LSP ping exploration packet is also described in RFC 5884.

The ESI Ping request packet 22A, 22B may include, but is not limited to: a local discriminator 24 (or "My Discriminator") generated by PE router 10C based on the LSP-Ping protocol that uses the BFD protocol. Further details of the BFD protocol can be found in RFC 5880 "Bidirectional Forwarding Detection (BFD)," June 2010, the entire contents of which are incorporated herein by reference. The local discriminator 24 may correspond to or identify a participant in a particular BFD session, such as PE router 10C. As later described in this disclosure, PE router 10B may send an ESI Ping reply 26 to PE router 10C that includes the local discriminator 24 of PE router 10C. In this way, PE router 10C may determine that PE router 10B is a participant in the initiated BFD session and has successfully established a BFD session with PE router 10C. In some examples, the ESI Ping reply 26 from PE router 10B to PE router 10C may be a BFD Control message that further includes a label stack with an outer transport label for a next hop in a path from PE router 10B to PE router 10C, and inner service label that represents the MPLS Alias Label, which PE router 10C previously advertised to PE router 10B in an Ethernet AD route.

PE router 10B may receive the ESI Ping request packet 22B that is sent by PE router 10C. In some examples, PE router 10C may set the Time-to-Live (TTL) value in the ESI Ping request packet 22B to 1, such that PE router 10B will not forward the ESI Ping request packet 22B into ESI 200, but rather process the ESI Ping request packet 22B in the routing engine (or control plane) of PE router 10B. Upon receiving the ESI Ping request 22B, PE router 10B may determine that the received message is an ESI Ping request packet based on its contents. For instance PE router 10B may run BFD and EVPN protocols. Based on determining that the message 22B includes an EVPN label stack of inner service label and outer transport label, and further that the contents of the message 22B include a BFD local discriminator 24, PE router 10B may generate an ESI Ping reply message 26. The ESI Ping reply message 26 may be a LSP ping exploration reply that further includes a label stack with an outer transport label for a next hop in a path from PE router 10B to PE router 10C, and inner service label that represents the MPLS Alias Label, which PE router 10C previously advertised to PE router 10B in an Ethernet AD route. The message 26 generated by PE router 10B in response to the ESI Ping request packet 22B may include the BFD local discriminator 24 received from PE router 10C and a BFD remote discriminator (or "Your Discriminator") 28 that corresponds to or identifies PE router 10B as a participant in the particular BFD session. PE router 10B may send the ESI Ping reply 26 back to PE router 10C.

PE router 10C, upon receiving the ESI Ping reply message 26 from PE router 10B, may determine that the ESI Ping reply message 26 includes the local discriminator 24 of PE router 10C and a remote discriminator 28 of PE router 10B for a BFD session. PE router 10C may utilize the BFD protocol as a light-weight means of testing the data plane between PE router 10C and PE router 10B. The light-weight nature of the BFD protocol may allow PE router 10C to implement the BFD protocol in hardware or firmware. The BFD protocol may provide faster detection of data plane failures with sub-second granularity. For example, PE router 10C may execute a low-cost BFD test of a path between PE router 10C and PE router 10B for ESI 200 at a higher frequency, e.g., once every 10milliseconds, than between iterations of the more extensive EVPN protocol that is used to periodically verify the control plane against the data plane between PE routers 10C and 10B.

As shown in FIG. 1, upon receiving ESI Ping reply message from PE router 10B, PE route 10C may establish and execute a BFD session 20B between PE router 10C and PE router 10B. Additionally, upon receiving ESI Ping reply message from PE router 10A, PE route 10C may establish and execute a BFD session 20A between PE router 10C and PE router 10A. Although the following example of FIG. 1 is described with respect to BFD session 20B, similar techniques may be applied with respect to BFD session 20A.

PE router 10C and PE router 10B may exchange BFD packets, e.g., BFD packet 30, which include the local and remote discriminators 32 (e.g., local discriminator 24 and remote discriminator 28), in the BFD session according to a mode specified in RFC 5880, such as Asynchronous or Demand mode, or using an adjunct Echo function. The BFD packets may include an EVPN label stack 34 having an outer transport label and inner service label to route the packets between PE routers for a specific Ethernet Segment, such as ESI 200. In this way, a BFD session may be established on a per-ESI basis because the BFD packets have an EVPN label stack that includes an inner service label that corresponds to a particular ESI for an Ethernet Segment. As such, PE router 10C may determine that a BFD session has terminated or has been interrupted if either communication link 16E fails or a network device or link on a path between route reflector 18 and PE router 10B fails. That is, if either communication link 16E fails or a network device or a link on a path between route reflector 18 and PE router 10B fails, PE router 10C may no longer receive BFD reply messages that correspond to a BFD session for ESI 200 from PE router 10B. As an example, if communication link 16E fails, PE router 10B may not send BFD reply messages for BFD session 20B that corresponds to ESI 200 because PE router 10B cannot forward network packets to CE router 8B for ESI 200.

PE router 10C may install respective forwarding next hops for each of PE routers 10A and 10B in forwarding structures (e.g., forwarding tables, context tables, radix trees, next hop lists, chained next hops, or the like) of one or more of PE router 10C's forwarding units to forward network packets. A forwarding next hop for PE router 10A may specify one or more operations that cause PE router 10C to forward a network packet out an egress interface that couples PE router 10C to PE router 10A. Similarly, a forwarding next hop for PE router 10B may cause PE router 10C to forward a network packet out an egress interface that couples PE router 10C to PE router 10B.

PE router 10C may use the forwarding next hops to load balance traffic from PE router 10C between PE routers in Ethernet Segment 14, such as PE router 10A and PE router 10B. When forwarding traffic, PE router 10C may perform a lookup on packet header information of a packet and determine that the packet is destined for a device in customer network 6B. For example, a lookup on a packet header may resolve to an entry in a forwarding structure such as a radix tree that corresponds to one or more forwarding next hops. PE router 10C may use a hashing algorithm to vary the selection of the forwarding next hops for PE routers 10A and 10B in order to load-balance network packets between PE routers 10A and 10B, which are each included in Ethernet Segment 14. PE router 10C may initially load-balance the forwarding of network packets to PE routers 10A and 10B while no failure has occurred at communication link 16E and no failure has occurred at a network device or a link on a path between route reflector 18 and PE router 10B.

At a later time, communication link 16E may fail in the example of FIG. 1. PE router 10B stop sending BFD reply messages for BFD session 20B that corresponds to ESI 200 because PE router 10B cannot forward network packets to CE router 8B for ESI 200. PE router 10C may determine that BFD session 20B has terminated or been interrupted and therefore network traffic can no longer flow from PE router 10C to CE router 8B via a path that includes PE router 10B. As such, PE router 10C may re-direct network traffic for Ethernet Segment 14 to other PE routers that are also operating in active-active mode for Ethernet Segment 14, such as PE router 10A. To re-direct network traffic, PE router 10C may invalidate the forwarding next hop for PE router 10B. Accordingly, if PE router 10C performs a lookup on a packet destined for a device in customer network 6B, PE router 10C may forward the network packet using the operations of the forwarding next hop for PE router 10A. That is, invalidating the forwarding next hop for PE router 10B may remove a route for PE router 10B from a forwarding structure of PE router 10C, such that traffic is no longer forwarded by PE router 10C to PE router 10B. In this way, by detecting that BFD session 20B between PE router 10C and PE router 10B for ESI 200 has been terminated or interrupted, PE router 10C may stop load-balancing network traffic to PE router 10B, thereby reducing the number of packets dropped at PE router 10B or between route reflector 18 and PE router 10B after a failure of link 16E. By using BFD sessions on a per-ESI basis between PE routers 10A and 10B, PE router 10C may detect a link failure more quickly in the data plane, than if PE router 10C eventually received a BGP message in the control plane that indicated a route no longer existed between PE router 10B and CE router 8B.

In the example of FIG. 1, after invalidating the forwarding next hop for PE router 10B, PE router 10C may later receive from PE router 10B, a request 36 to withdraw the Ethernet Auto-Discovery route 21B for PE router 10B. That is, PE router 10B may send a BGP control plane message 36 to indicate withdrawal from Ethernet Segment 14 that corresponds to ESI 200. PE router 10C, and more specifically routing engine 84 as further described in FIG. 2, may update one or more forwarding units of PE router 10B to only encapsulate network traffic with an EVPN label stack for PE router 10A (e.g., the remaining PE routers after PE router 10B is withdrawn). PE router 10C, upon receiving the BGP control plane message 36 to withdraw PE router 10B, may perform global repair by removing PE router 10B from an adjacency list maintained by PE router 10C that includes each member of Ethernet Segment 14. The BGP control plane message 36 to withdraw PE router 10B from Ethernet Segment 14 may take seconds to send, receive and process, due to route reflector 18 processing the control plane message from PE router 10B and forwarding it to PE router 10C, and further due to processing time at PE router 10C to withdraw PE router 10B. Techniques of the disclosure may use the per-ESI BFD sessions to detect failures more quickly and thereby redirect network traffic for the Ethernet Segment more quickly to reduce the number of packets dropped at PE router 10B as a result of failure at link 16E.

Figure 2:
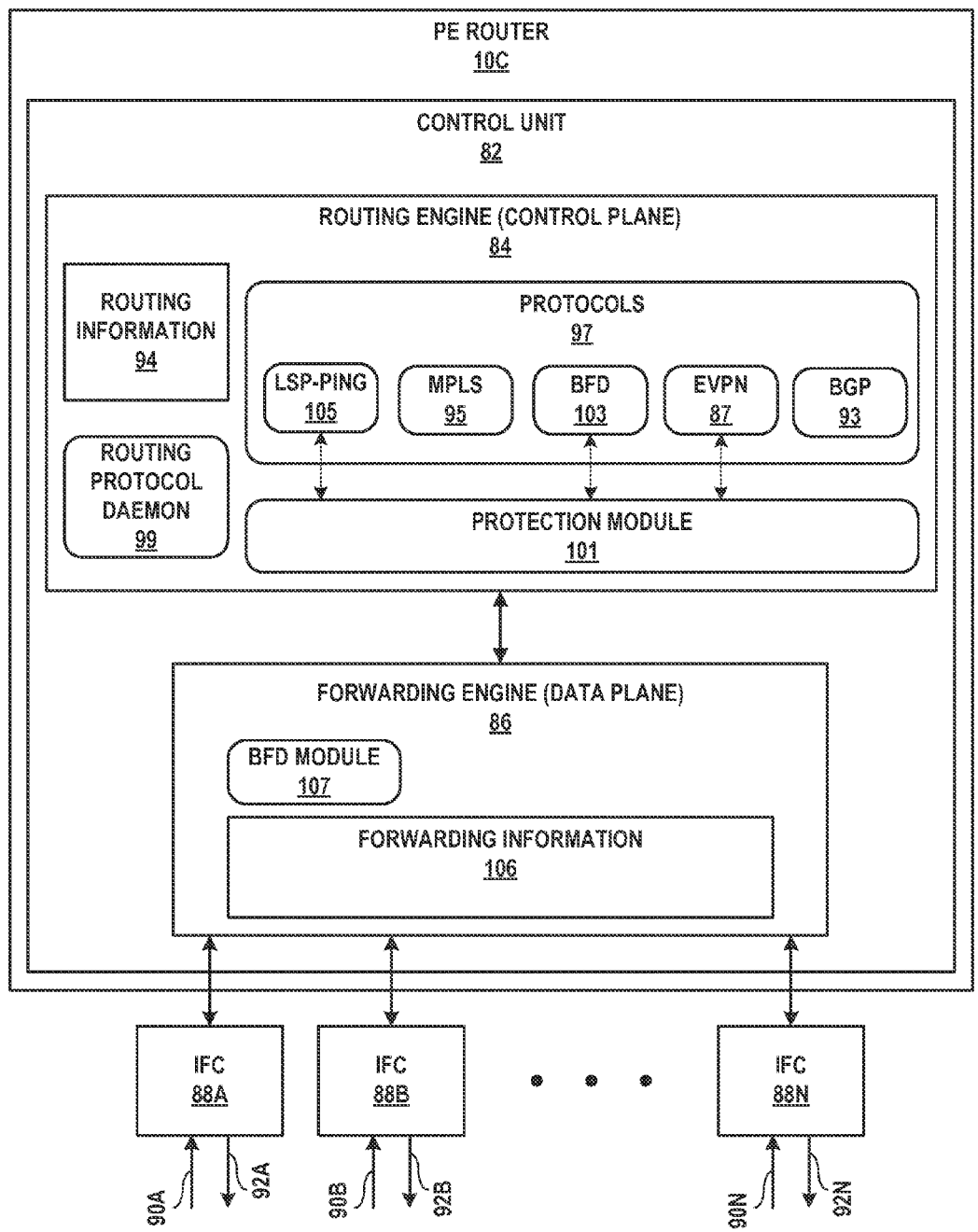
FIG. 2 is a block diagram illustrating an exemplary PE router capable of performing the disclosed techniques.

FIG. 2 is a block diagram illustrating an exemplary PE router 10C capable of performing the disclosed techniques. In general, PE router 10C may operate substantially similar to PE router 10C of FIG. 1. In this example, PE router 10C includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. PE router 10C also includes a control unit 82 that determines routes of received packets and forwards the packets accordingly via IFCs 88.

Control unit 82 may comprise a routing engine 84 and a packet forwarding engine 86. Routing engine 84 operates as the control plane for PE router 10C and includes an operating system that provides a multi-tasking operating environment for execution of a number of concurrent processes. Routing engine 84, for example, execute software instructions to implement one or more control plane networking protocols 97. For example, protocols 97 may include one or more routing protocols, such as Border Gateway Protocol (BGP) 99 for exchanging routing information with other routing devices and for updating routing information 94. Protocols 97 may also include Multiprotocol Label Switching Protocol (MPLS) 95 for tunneling packets within service provider network 12. Protocols 97 may also include Bidirectional Forwarding Detection (BFD) protocol 103. Protocols 97 may include LSP-Ping 105, which implements the LSP-ping protocol of RFC 5884.

Routing protocol daemon (RPD) 99 may use protocols 97 to exchange routing information, stored in routing information 94, with other routers. Routing information 94 may include information defining a topology of a network. RPD 99 may resolve the topology defined by routing information in routing information 94 to select or determine one or more routes through the network. RPD 99 may then generate forwarding information 106 and update forwarding plane 86 with routes from forwarding information 106. Routing engine 84 executes EVPN protocol 87, which operates to communicate with other routers to establish and maintain an EVPN, such as the EVPN of FIG. 1, for transporting L2 communications through an intermediate network so as to logically extend an Ethernet network through the intermediate network. EVPN protocol 87 may, for example, communicate with EVPN protocols executing on remote routers.

Routing information 94 may describe a topology of the computer network in which PE router 10C resides, and may also include routes through the shared trees in the computer network. Routing information 94 describes various routes within the computer network, and the appropriate next hops for each route, i.e., the neighboring routing devices along each of the routes. Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures.

In some examples, forwarding engine 86 arranges forwarding structures as forwarding next hop data that can be chained together as a series of "forwarding next hops" along an internal packet forwarding path for the network device. In many instances, the forwarding structures perform lookup operations within internal memory of ASICs included in forwarding engine 86, where the lookup may be performed against a tree (or trie) search, a table (or index) search. Other example operations that may be specified with the forwarding next hops include filter determination and application, or a rate limiter determination and application. Lookup operations locate, within a lookup data structure (e.g., a lookup tree), an entry that matches packet contents or another property of the packet or packet flow, such as the inbound interface of the packet. The result of packet processing in accordance with the operations defined by the forwarding next hop structure within ASICs determines the manner in which a packet is forwarded or otherwise processed by forwarding engine 86 from its input interface on one of IFCs 88 to its output interface on one of IFCs 88.

In FIG. 2, forwarding engine 86 may receive Ethernet AD routes sent by PE routers 10A and 10B to PE router 10C. For instance, forwarding engine 86 may receive a packet that specifies an Ethernet AD route from PE router 10A and which includes the route descriptor, Ethernet Segment Identifier, Ethernet Tag ID and MPLS label. Forwarding engine 86 may receive an Ethernet AD route from PE router 10B that includes the route descriptor, Ethernet Segment Identifier, Ethernet Tag ID and MPLS label. If forwarding engine 86 determines that the packet specifies an Ethernet AD route, forwarding engine 86 may send the packet data to protection module 101.

Protection module 101 may determine that the ESI for each of the Ethernet AD routes is the same for at least two routers that are coupled PE router 10C and operating in EVPN active-active mode. As such, PE router 10C may, in some examples, provide protection for one or more of the PE routers operating in active-active mode for the same Ethernet Segment, such as PE router 10B. For example, protection module 101 may initially request an LSP-Ping formatted packet or information to generate an LSP-Ping packet from LSP-Ping 105. In some examples, protection module 101 requests a local discriminator from BFD 103, which protection module 101 may include in the LSP-Ping packet. Protection module 101 may further determine from EVPN 87 an inner service label (or MPLS Alias Label) that PE router 10B previously advertised for ESI 200 that corresponds to Ethernet Segment 14. Protection module 101 may also determine an outer transport label that corresponds to a next hop from PE router 10C to PE router 10B. Protection module 101 may assemble the ESI Ping request, as the LSP-Ping packet, which further includes the local discriminator received from BFD 103 and an attached EVPN label stack that includes the outer transport label and inner service label determined from EVPN 87. As described in FIG. 1, protection module 101 may set the TTL value for the ESI Ping request packet to 1. Protection module 101 may store state information that associates the ESI for the inner service label with the local discriminator received from BFD 103, such that protection module 101 can identify a BFD session 20B for the local discriminator on a per-ESI basis.

Protection module 101 may then send the packet to forwarding engine 86, which forwards the ESI Ping request packet to PE router 10B using IFC 88B. As described in FIG. 1, PE router 10B receives the ESI Ping request. PE router 10B generates a remote discriminator and sends an ESI Ping reply message to PE router 10C that includes, but is no limited to, the remote discriminator generated by PE router 10B and the local discriminator generator by PE router 10C. PE router 10C may receive the ESI Ping reply message from PE router 10B via IFC 88B. Forwarding engine 106 may determine that the ESI Ping reply message is in response to the ESI Ping request packet and send to protection module 101 for further processing. For instance, forwarding engine 86 may determine that the ESI Ping reply message includes the local discriminator previously sent in the ESI Ping request packet and further includes a remote discriminator generated by PE router 10B.

Protection module 101 may determine that the local discriminator of the ESI Ping reply message matches the local discriminator previously generated by BFD 103 for BFD session 20B with PE router 10B for ESI 200 of Ethernet Segment 14. Protection module 101 may store state information that further associates the local discriminator received from PE router 10B with the local discriminator generated by PE router 10C, such that protection module 101 can identify BFD session 20B for the local and remote discriminators on a per-ESI basis. Protection module 101 may send the local and remote discriminators to BFD 103 to request that BFD 103 initiate and execute BFD session 20B with PE router 10B using BFD module 107 that is implemented in forwarding engine 86. BFD 103 may send the local and remote discriminators to BFD module 107, which executes BFD session 20B with PE router 10B. To execute BFD session 20B with PE router 10B, BFD module 107 may generate BFD packets in accordance with RFC 5880. However, BFD module 107 may further attach an EVPN label stack including an outer transport label and inner service label to the BFD packets in order to route the BFD packets to PE router 10B. For instance, BFD module 107 may determine the outer transport label and inner service label from forwarding information 106, BFD 103 and/or protection module 101. The inner service label (or MPLS Alias Label) may have been previously advertised from PE router 10B for ESI 200 that corresponds to Ethernet Segment 14, and the outer transport label corresponds to a next hop from PE router 10C to PE router 10B.

BFD module 107 may cause forwarding engine 86 to execute BFD session 20B by exchanging BFD packets with PE router 10B, which include the local and remote discriminators, in BFD session 20B according to a mode specified in RFC 5880, such as Asynchronous or Demand mode, or using an adjunct Echo function. If PE router 10B determines, for example, that link 16E has failed, PE router 10B may stop sending BFD packets in response to the BFD packets sent by PE router 10C. For instance PE router 10C may send to PE router 10B, BFD packets that include at least the local discriminator for BFD session 20B and an EVPN service label that was advertised by PE router 10B. In response to sending the BFD packets that include the local discriminator and the EVPN service label, PE router 10C may receive from PE router 10B, BFD packets that include the remote discriminator generated PE router 10B, the local discriminator generated by PE router 10C and an EVPN service label that was advertised by PE router 10C to PE router 10B.

As described in FIG. 1, PE router 10C may install respective forwarding next hops for each of PE routers 10A and 10B in forwarding structures (e.g., forwarding tables, context tables, radix trees, next hop lists, chained next hops, or the like) of one or more of PE router 10C's forwarding units to forward network packets. For instance, RPD 99 may store respective forwarding next hops for each of PE routers 10A and 10B in forwarding information 106. The forwarding next hop for PE router 10A may specify one or more operations that cause forwarding engine 86 to forward a network packet out an egress interface, such as interface 88A, that couples PE router 10C to PE router 10A. Similarly, a forwarding next hop for PE router 10B may cause forwarding engine 86 to forward a network packet out an egress interface, such as interface 88B, that couples PE router 10C to PE router 10B.

Forwarding engine 86 may initially use the forwarding next hops to load balance traffic received at PE router 10C between PE routers in Ethernet Segment 14, such as PE router 10A and PE router 10B. This forwarding of traffic may occur while BFD session 20B is executing between PE routers 10B and 10C. When forwarding traffic, forwarding engine 86 may perform a lookup on packet header information of a packet and determine that the packet is destined for a device in customer network 6B. For example, a lookup on a packet header may resolve to an entry in a forwarding structure of forwarding information 106 such as a radix tree that corresponds to one or more forwarding next hops. Forwarding engine 86 may implement a hashing algorithm to vary the selection of the forwarding next hops for PE routers 10A and 10B in order to load-balance network packets between PE routers 10A and 10B, which are each included in Ethernet Segment 14. Forwarding engine 86 may initially load-balance the forwarding of network packets to PE routers 10A and 10B while no failure has occurred at communication link 16E and no failure has occurred at a network device or a link on a path between route reflector 18 and PE router 10B.

At a later time, link 16E may have failed or network traffic is no longer flowing from PE router 10C to CE router 8B via PE router 10B. PE router 10B, for instance, may have determined that link 16E has failed. As such, PE router 10B may stop replying to PE router 10C with BFD packets that include the local and remote descriptors corresponding to BFD session 20B for Ethernet Segment 14 (having ESI 200) between PE routers 10B and 10C. BFD module 107 of PE router 10C may determine that BFD session 20B has been interrupted or terminated because BFD module 107 has not received BFD packet within a threshold period of time from PE router 10B that includes the remote discriminator of PE router 10B and local discriminator generated by PE router 10C. Accordingly, BFD module 107 may determine that network traffic is no longer able to flow from PE router 10C to CE router 8B via PE router 10B. BFD module 107 may invalidate a forwarding next hop for PE router 10B in forwarding information 106, as described in FIG. 1.

Upon invalidating the forwarding next hop for PE router 10B, if forwarding engine 86 performs a lookup on a packet destined for a device in customer network 6B using forwarding information 104, forwarding engine 86 may forward the network packet using the operations of the forwarding next hop for PE router 10A. Invalidating the forwarding next hop for PE router 10B may remove a route in forwarding information 106 for PE router 10B, such that traffic is no longer forwarded by forwarding engine 86 to PE router 10B. In this way, by detecting at BFD module 107 that BFD session 20B between PE router 10C and PE router 10B for ESI 200 has been terminated or interrupted, BFD module 107 may cause forwarding engine 86 to stop load-balancing network traffic to PE router 10B, thereby reducing the number of packets dropped at PE router 10B or between route reflector 18 and PE router 10B after a failure of link 16E. By using BFD sessions on a per-ESI basis between PE routers 10A and 10B, BFD module 107 may detect a link failure more quickly in the data plane, than if PE router 10C eventually received a BGP message in the control plane that indicated a route no longer existed between PE router 10B and CE router 8B.

The architecture of PE router 10C illustrated in FIG. 2 is shown for exemplary purposes only. The invention is not limited to this architecture. In other examples, PE router 10C may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Figure 3:
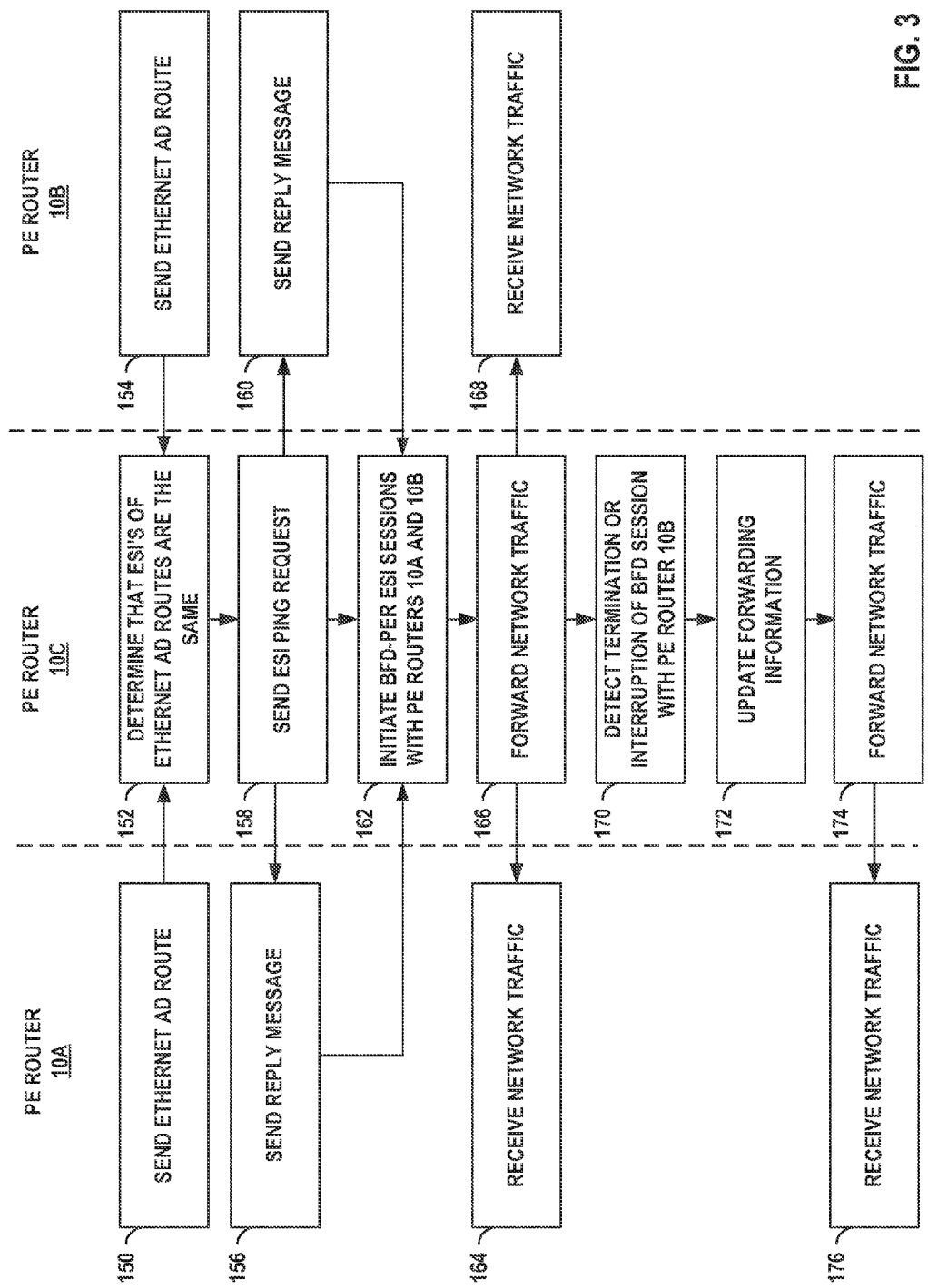
FIG. 3 is a flowchart illustrating example operations of multiple network devices in accordance with techniques of the disclosure.

FIG. 3 is a flowchart illustrating example operations of multiple network devices in accordance with techniques of the disclosure. Example operations in accordance with techniques of the disclosure are illustrated for example purposes with respect to PE routers 10A-10C of FIGS. 1-2. For simplicity, operation of other network devices is not shown in FIG. 4.

As shown in FIG. 3, the PE routers of the Ethernet segment, e.g., PE routers 10A-10C of Ethernet segment 14, may, at initial configuration and startup, exchange Ethernet AD routes. For instance, each of PE routers 10A and 10B may send Ethernet AD routes to PE router 10C (150, 154). PE router 10C may listen for Ethernet AD routes and receive packets specifying Ethernet AD routes from each of PE routers 10A and 10B.

PE router 10C may determine that each ESI included in the respective Ethernet AD routes from PE routers 10A and 10B is the same (152). For instance, PE router 10C may compare the ESIs of the respective Ethernet AD routes and determines that the ESIs match one another. PE router 10C may also determine that PE router 10C is coupled to PE routers 10A and 10B and that PE routers 10A and 10B are each configured in active-active mode in the same Ethernet Segment. PE router 10C may send ESI Ping requests to PE routers 10A and 10B (158). With respect to the ESI Ping request packet for PE router 10B, PE router 10C may generate the ESI Ping request packet as an LSP ping exploration packet for PE router 10B with an attached EVPN label stack that includes an outer transport label for a next hop on a path to PE router 10B and inner service label that represents the MPLS Alias Label, which PE router 10B previously advertised to PE router 10C in an Ethernet AD route.

Each of PE routers 10A and 10B may receive the ESI Ping requests. Based on determining that the message includes an EVPN label stack of inner service label and outer transport label, and further that the contents of the message includes a BFD local discriminator, PE routers 10A and 10B may generate ESI Ping reply messages. As described in FIG. 1, the ESI Ping reply message may be an LSP-Ping exploration reply packet that further includes a label stack with an outer transport label for a next hop in a path from PE router 10B to PE router 10C, and inner service label that represents the MPLS Alias Label, which PE router 10C previously advertised to PE router 10B in an Ethernet AD route. The ESI Ping reply generated by PE router 10B in response to the ESI Ping request packet may include the BFD local discriminator received from PE router 10B and a BFD remote discriminator (or "Your Discriminator") that corresponds to or identifies PE router 10B as a participant in the particular BFD session. PE router 10B may send an ESI Ping reply back to PE router 10C (160). Similarly, PE router 10A may send an ESI Ping reply back to PE router 10C (158).

PE router 10C may initiate and establish BFD session with PE routers 10A and 10B by exchanging BFD packets in separate per-ESI BFD sessions with each of PE routers 10A and 10B, where the BFD packets include the respective local and remote discriminators for each respective BFD session (162). The BFD packets may include an EVPN label stack having an outer transport label and inner service label to route the packets between PE routers for a specific Ethernet Segment, such as ESI 200. In this way, a BFD session may be established on a per-ESI basis because the BFD packets have EVPN label stack that includes an inner service label that corresponds to a particular ESI for an Ethernet Segment.

PE router 10C may forward network traffic to Ethernet Segment 14 having ESI 200 by load-balancing network traffic to each of PE routers 10A and 10B (166). PE routers 10A and 10B receive the network traffic (164, 168) and forward the network traffic to customer network 6B or other respective destination. At a later time, communication link 16E, as shown in FIG. 1, may fail. PE router 10C may detect that the BFD session 20B has terminated or been interrupted and therefore network traffic can no longer flow from PE router 10C to CE router 8B via a path that includes PE router 10B (170). For instance, PE router 10B stop sending BFD reply messages for BFD session 20B that corresponds to ESI 200 because PE router 10B cannot forward network packets to CE router 8B for ESI 200.

PE router 10C may update its forwarding state to re-direct network traffic for Ethernet Segment 14 to other PE routers that are also operating in active-active mode for Ethernet Segment 14, such as PE router 10A (172). For instance, to re-direct network traffic, PE router 10C may invalidate a forwarding next hop for PE router 10B in its forwarding information. Accordingly, if PE router 10C performs a lookup on a packet destined for a device in customer network 6B, PE router 10C may forward the network packet using the operations of the forwarding next hop for PE router 10A (174). PE router 10C may forward traffic for Ethernet Segment 14 to PE router 10A and bypass PE router 10B altogether because PE router 10B cannot forward traffic to customer network 6B due to the link failure. PE router 10A may receive the network traffic and forward it to customer network 6B or other intended destination.

In some examples, the end-to-end convergence time for a network failure may be the sum of the time taken to detect the failure and the time taken for corrective action. Techniques of the disclosure may reduce the upper bound on time taken to detect failure by leveraging data plane OAM mechanisms, which are independent of load in the control plane and other network events. The techniques may also ensure that local repair is exercised to ensure faster convergence. Accordingly, techniques of the disclosure may reduce the end to end convergence in multi-homing topologies and may make end to end convergence independent of the scale of the control plane.

Figures 4A, 4B:
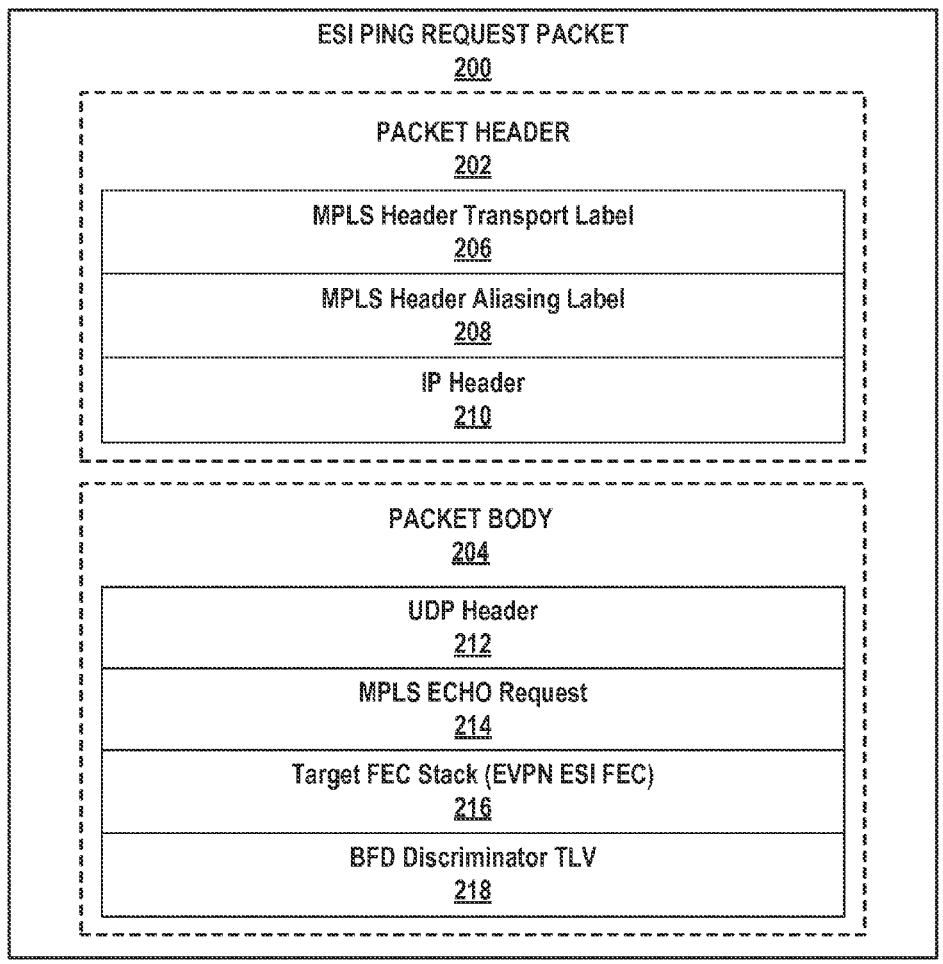
FIGS. 4A-4B are block diagrams illustrating an exemplary format of an ESI Ping request packet and EVPN ESI FEC information, in accordance with techniques of the disclosure.

FIGS. 4A-4B are block diagrams illustrating an exemplary format of an ESI Ping request packet and EVPN ESI FEC information, in accordance with techniques of the disclosure. ESI Ping request packet 200 includes a packet header 202 and a packet body 204. In the example of FIG. 4A, PE router 10C may generate the ESI Ping request packet.

As illustrated in FIG. 4A, packet header 202 may include data fields for EVPN and Internet Protocol v4 or v6. For instance, packet header 202 includes an MPLS Header Transport Label 206 and an MPLS Header Aliasing Label 208. In the example of FIG. 4A, if PE router 10C generates ESI Ping request packet 200 for PE router 10B, MPLS Header Transport Label 206 may corresponds to a label-switched path between PE router 10C and a next hop network device en route to PE router 10B. For instance, the next hop network device may have previously advertised the MPLS Header Transport Label 206 to PE router 10C, which PE router 10C may apply to packets that are sent to the next hope network device. MPLS Header Aliasing Label 208 may be the MPLS Alias Label that PE router 10B previously advertised in its Ethernet AD route to PE router 10C. Packet header 202 may also include IP header 210. IP header 210 may include but is not limited to: IP source address, IP destination address, source port, destination port, and hop limit (or time-to-live value).

Packet body 204 may include a User Datagram Protocol (UDP) packet. Packet body 204 may include a UDP header 212. UDP header 212 may include but is not limited to: a source port, destination port, length, and checksum. Packet body 204 may include MPLS ECHO request information 214 as specified in RFC 4379 "Detecting Multi-Protocol Label Switched (MPLS) Data Plane Failures," February 2006, the entire contents of which are incorporated herein by reference. Packet body 204 may also include Target FEC Stack (EVPN ESI FEC) 216. The contents of Target FEC Stack 216 are further illustrated in FIG. 4B. Packet body 204 may also include a BFD Discriminator TLV 218. BFD Discriminator TLV 218 may specify a local ("My") discriminator generated by PE 10C.

FIG. 4B illustrates the contents of Target FEC Stack (EVPN ESI FEC) 216 of FIG. 4A in further detail as Target FEC Stack (EVPN ESI FEC) 220. For instance, Target FEC Stack (EVPN ESI FEC) 220 includes a route distinguisher that corresponds to PE router 10C. Target FEC Stack (EVPN ESI FEC) 220 may also include the Ethernet Segment Identifier for the per-ESI BFD session, such as ESI 200 in FIG. 1. In some examples, the 16 highest order bits of Target FEC Stack (EVPN ESI FEC), which are labeled as "zero value", must be zero.

With respect to techniques of this disclosure, MAC addresses of devices may be learned by PE routers in EVPN over ESI and ESI Ping packets used on demand may provide a tool to verify an ESI advertised by remote PE. ESI Ping packets used on demand may help validating control plane and data plane synchronization.

Figure 5:
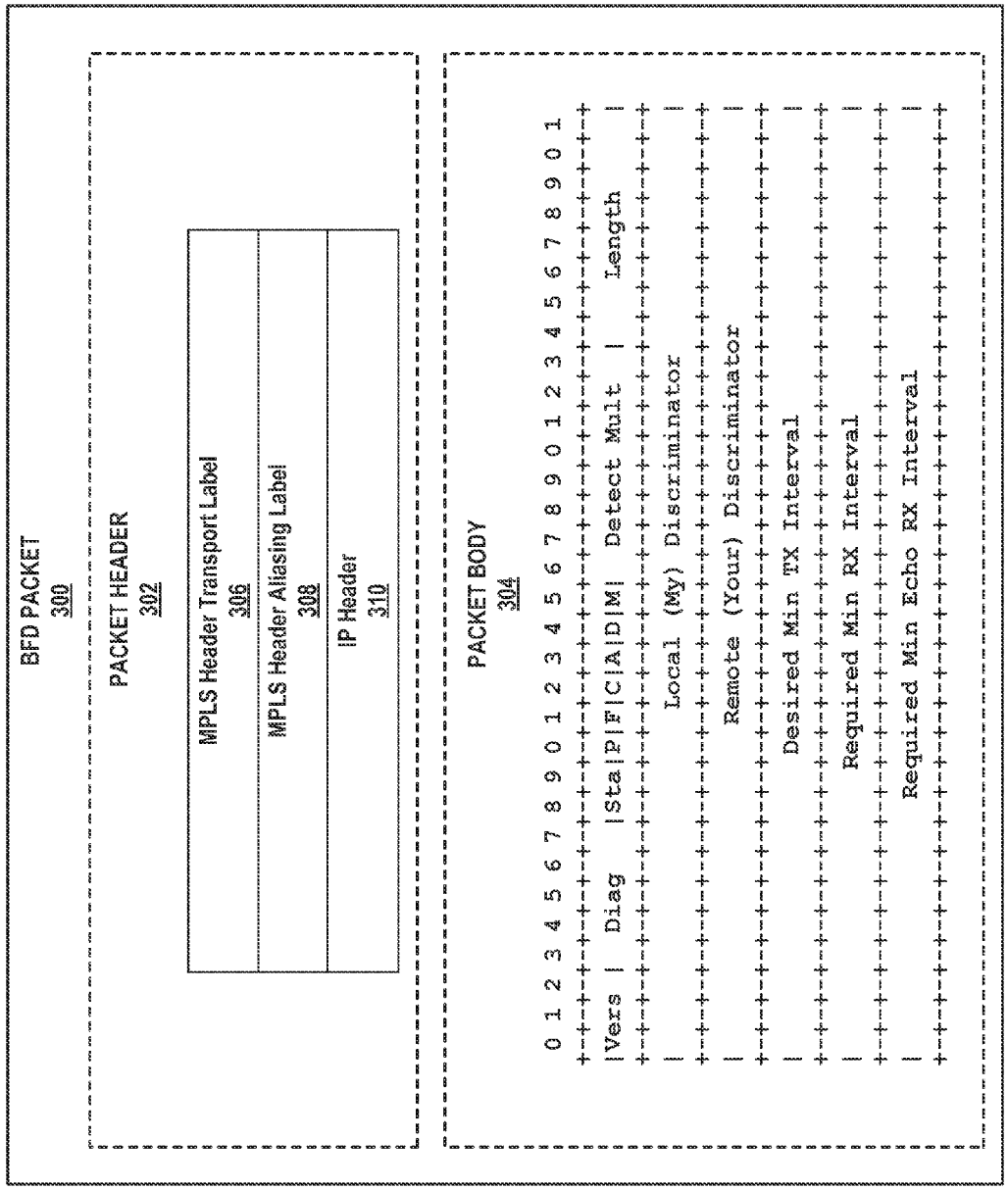
FIG. 5 is a block diagram illustrating an exemplary format of a Bidirectional Forwarding Detection packet for a per-ESI BFD session, in accordance with techniques of the disclosure.

FIG. 5 is a block diagram illustrating an exemplary format of BFD packet 300 for a per-ESI BFD session, in accordance with techniques of the disclosure. BFD packet 300 includes a packet header 302 and a packet body 304. In the example of FIG. 5, PE router 10C may generate BFD packet 300.

As illustrated in FIG. 5, packet header 302 may include data fields for EVPN and Internet Protocol v4 or v6. For instance, packet header 302 includes an MPLS Header Transport Label 306 and an MPLS Header Aliasing Label 308. In the example of FIG. 5, if PE router 10C generates BFD packet 300 for PE router 10B, MPLS Header Transport Label 306 may corresponds to a label-switched path between PE router 10C and a next hop network device that is one hop downstream from PE router 10C en route to PE router 10B. For instance, the next hop network device may have previously advertised the MPLS Header Transport Label 306 to PE router 10C, which PE router 10C may apply to packets that are sent to the next hope network device. MPLS Header Aliasing Label 308 may be the MPLS Alias Label that PE router 10B previously advertised in its Ethernet AD route to PE router 10C. Packet header 302 may also include IP header 310. IP header 310 may include but is not limited to: IP source address, IP destination address, source port, destination port, and hop limit (or time-to-live value). Packet body 304 may include but is not limited to the contents of a BFD packet as described in RFC 5880, as shown in FIG. 5. Packet body 304 may include additional information, such as UDP header information and/or a BFD Authentication Section.

In various examples of this disclosure, BFD packets may be sent on the same tunnel as that of customer traffic for the Ethernet Segment. BFD packets may have dentation IP addresses set to 127/8 ranges as explained in RFC 5884. BFD packet may have source IP address set to the outgoing interface IP address. Bootstrapping may be used to associate a BFD packet to BFD session if the BFD packet carries destination address IP set to 127/8 and also the inner label is the same for ESI in an instance for the BFD session. In other words, ESI Ping may be used to bootstrap a BFD session, to exchange BFD discriminator as defined in RFC 5884, such that BFD packet will be using same MPLS header as that of data packets to reach egress PE router.

Techniques of the disclosure using per-ESI BFD session may provide detection of failures in the data plane as the techniques may not not depend on sending a withdrawal message to a route reflector or other intermediate network devices and may not depend on other events in the network and load on the network. Techniques of the disclosure may provide faster repair because the techniques may trigger BFD-based local repair and later global repair. Techniques of the disclosure using periodic ESI ping can also check the control plane and data plane synchronization and can detect traffic black-holing. BFD triggered local repair using techniques of the disclosure may reduce the time taken for corrective action irrespective of scale.

Various embodiments of the invention have been described. These and other embodiments are within the scope of the following claims.

The invention claimed is:

1. A method comprising:
    determining, by a remote provider edge (PE) router coupled by an intermediate network to at least two PE routers operating in active-active mode for a particular Ethernet Segment in an Ethernet Virtual Private Network (EVPN) with the remote PE router, wherein the at least two PE routers are locally connected to a multi-homed customer network by the particular Ethernet Segment; and
    sending, by the remote PE router and based on determining that the at least two PE routers operating in the EVPN are connected to the multi-homed customer network by the particular Ethernet Segment, an Ethernet Segment Identifier (ESI) Ping request packet through the intermediate network to one of the at least two PE routers to initiate a Bidirectional Forwarding Detection (BFD) session on a per ESI basis, wherein the ESI Ping request packet includes at least a BFD discriminator and an ESI for the particular Ethernet Segment that locally connects the at least two PE routers to the multi-homed customer network.

2. The method of claim 1, further comprising:
    in response to receiving an ESI Ping reply packet from the one of the at least two PE routers, establishing, by the remote PE router and with the one of the at least two PE routers, the BFD session for the ESI through the EVPN; and
    in response to determining that the BFD session with the one of the at least two PE routers for the ESI has at least been interrupted or terminated, forwarding network traffic through the EVPN to bypass the one of the at least two PE routers.

3. The method of claim 2, wherein forwarding network traffic through the EVPN to bypass the one of the at least two PE routers further comprises:
    updating, by the remote PE router, a forwarding unit of the remote PE router to only encapsulate network traffic with an EVPN label stack for the remaining ones of the at least two PE routers.

4. The method of claim 2, wherein the one of the at least two PE routers is a first PE router and another of the at least two PE routers is a second PE router, the method further comprising:
    installing, by the remote PE router and within at least one forwarding unit of the remote PE router, a first forwarding next hop that forwards network traffic to the first PE router and a second forwarding next hop that forwards network traffic to the second PE router;
    wherein load-balancing network traffic from the remote PE router to the at least two PE routers further comprises, forwarding network traffic between the at least two PE routers based at least in part on the first forwarding next hop and the second forwarding next hop; and
    in response to determining that the BFD session with the one of the at least two PE routers for the ESI has at least been interrupted or terminated, invalidating the first forwarding next hop, such that network traffic is forwarded without first forwarding next hop.

5. The method of claim 4, further comprising:
prior to determining that the at least two PE routers are included in the particular Ethernet Segment, receiving, by the remote PE router and from the one of the at least two PE routers, an Ethernet Auto-Discovery route that includes the ESI; and
after invalidating the first forwarding next hop, receiving, by the remote PE router and from the one of the at least two PE routers, a withdrawal of the Ethernet Auto-Discovery route from the one of the at least two PE routers.

6. The method of claim 2, wherein determining that the BFD session has at least been interrupted or terminated comprises:
determining that the remote PE router has not received, within a threshold period of time, a BFD packet that:
includes a remote discriminator, and
is sent by the one of the at least two PE routers in response to the BFD packet that includes a local discriminator.

7. The method of claim 2,
wherein the BFD discriminator is a local discriminator,
wherein executing, by the remote PE router and with the one of the at least two PE routers, the BFD session for the ESI further comprises:
sending, by the remote PE router and to the one of the at least two PE routers, BFD packets that include at least the local discriminator and an EVPN service label that was advertised by the one of the at least two PE routers to the remote PE router; and
in response to sending the BFD packets that include at least the local discriminator and the EVPN service label, receiving, by the remote PE router and from the one of the at least two PE routers, the BFD packets that include at least a remote discriminator generated by the one of the at least two PE routers and an EVPN service label that was advertised by the remote PE router to the one of the at least two PE routers.

8. The method of claim 2, wherein the one of the at least two PE routers is a first PE router, wherein determining that the BFD session has at least been interrupted or terminated is based at least in part on the first PE router interrupting or terminating the BFD session with the remote PE router in response to the first PE router determining a communication link for the Ethernet Segment has failed between the first PE router and a customer edge router.

9. The method of claim 2, wherein the BFD discriminator is a local discriminator, and wherein the reply packet is an ESI Ping reply packet that includes at least a remote discriminator generated by the one of the at least two PE routers and the local discriminator generated by the remote PE router.

10. The method of claim 1, wherein the one of the at least two PE routers is a first PE router, wherein the ESI Ping request is a first ESI Ping request, the method further comprising:
sending a second ESI Ping request packet through the intermediate network to a second PE router of the at least two PE routers;
in response to receiving a second reply packet from the second PE router of the at least two PE routers, executing, by the remote PE router and with the second PE router, a second BFD session for the ESI through the EVPN.

11. A remote provider edge (PE) router coupled by an intermediate network to at least two PE routers operating in active-active mode for a particular Ethernet Segment in an Ethernet Virtual Private Network (EVPN) with the remote PE router, wherein the remote PE router comprises:
a routing engine that determines that the at least two PE routers are locally connected to a multi-homed customer network by the particular Ethernet Segment; and
a forwarding unit that sends, based on the routing engine determining that the at least two PE routers operating in the EVPN are connected to the multi-homed customer network by the particular Ethernet Segment, an Ethernet Segment Identifier (ESI) Ping request packet through the intermediate network to one of the at least two PE routers to initiate a Bidirectional Forwarding Detection (BFD) session on a per ESI basis, wherein the ESI Ping request packet includes at least a BFD discriminator and an ESI for the particular Ethernet Segment that locally connects the at least two PE routers to the multi-homed customer network.

12. The remote PE router of claim 11,
wherein the forwarding unit, in response to the remote PE router receiving an ESI Ping reply packet from the one of the at least two PE routers, establishes with the one of the at least two PE routers, the BFD session for the ESI through the EVPN; and
wherein the forwarding unit, in response to determining that the BFD session with the one of the at least two PE routers for the ESI has at least been interrupted or terminated, forwards network traffic through the EVPN to bypass the one of the at least two PE routers.

13. The remote PE router of claim 12,
wherein routing engine updates the forwarding unit to only encapsulate network traffic with an EVPN label stack for the remaining ones of the at least two PE routers.

14. The remote PE router of claim 12, wherein the one of the at least two PE routers is a first PE router and another of the at least two PE routers is a second PE router,
wherein the forwarding engine installs, within the forwarding unit of the remote PE router, a first forwarding next hop that forwards network traffic to the first PE router and a second forwarding next hop that forwards network traffic to the second PE router;
wherein the forwarding unit forwards network traffic between the at least two PE routers based at least in part on the first forwarding next hop and the second forwarding next hop; and
wherein the forwarding unit, in response to determining that the BFD session with the one of the at least two PE routers for the ESI has at least been interrupted or terminated, invalidates the first forwarding next hop, such that network traffic is forwarded without first forwarding next hop.

15. The remote PE router of claim 14,
wherein the routing engine, prior to determining that the at least two PE routers are included in the particular Ethernet Segment, receives, from the one of the at least two PE routers, an Ethernet Auto-Discovery route that includes the ESI; and
wherein the routing engine, after the forward unit has invalidated the first forwarding next hop, receives, from the one of the at least two PE routers, a withdrawal of the Ethernet Auto-Discovery route from the one of the at least two PE routers.

16. The remote PE router of claim 12,
wherein the forwarding unit determines that the remote PE router has not received, within a threshold period of time, a BFD packet that:

includes a remote discriminator, and
is sent by the one of the at least two PE routers in response to the BFD packet that includes a local discriminator.

17. The remote PE router of claim 11,
wherein the BFD discriminator is a local discriminator,
wherein the forwarding unit sends, to the one of the at least two PE routers, BFD packets that include at least the local discriminator and an EVPN service label that was advertised by the one of the at least two PE routers to the remote PE router; and
wherein the forwarding unit, in response to sending the BFD packets that include at least the local discriminator and the EVPN service label, receives, from the one of the at least two PE routers, the BFD packets that include at least a remote discriminator generated by the one of the at least two PE routers and an EVPN service label that was advertised by the remote PE router to the one of the at least two PE routers.

18. The remote PE router of claim 12, wherein the one of the at least two PE routers is a first PE router, wherein the interruption or termination of the BFD session is based at least in part on the first PE router interrupting or terminating the BFD session with the remote PE router in response to the first PE router determining a communication link for the Ethernet Segment has failed between the first PE router and a customer edge router.

19. The remote PE router of claim 12, wherein the BFD discriminator is a local discriminator, and wherein the reply packet is an ESI Ping reply packet that includes at least a remote discriminator generated by the one of the at least two PE routers and the local discriminator generated by the remote PE router.

20. A non-transitory computer-readable storage medium comprising instructions for causing at least one programmable processor of a remote provider edge (PE) router, to:
determine, by the remote provider edge (PE) router coupled by an intermediate network to at least two PE routers operating in active-active mode for a particular Ethernet Segment in an Ethernet Virtual Private Network (EVPN) with the remote PE router, wherein the at least two PE routers are locally connected to a multi-homed customer network by the particular Ethernet Segment; and
send, based on determining that the at least two PE routers operating in the EVPN are connected to the multi-homed customer network by the particular Ethernet Segment, an Ethernet Segment Identifier (ESI) Ping request packet through the intermediate network to one of the at least two PE routers to initiate a Bidirectional Forwarding Detection (BFD) session on a per ESI basis, wherein the ESI Ping request packet includes at least a BFD disciminator and an ESI for the particular Ethernet Segment that locally connects the at least two PE routers to the multi-homed customer network.

* * * * *